Patented Apr. 5, 1932

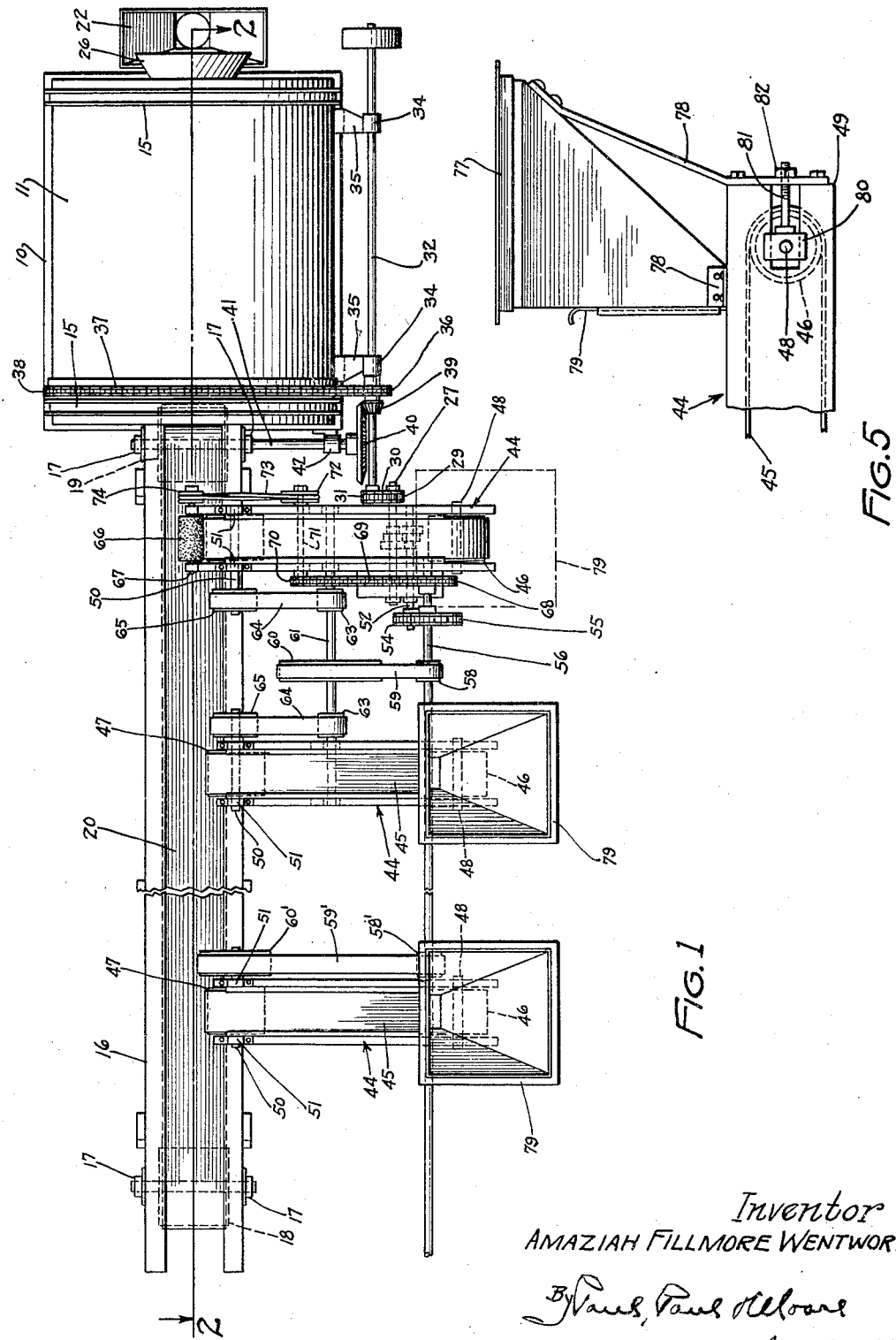

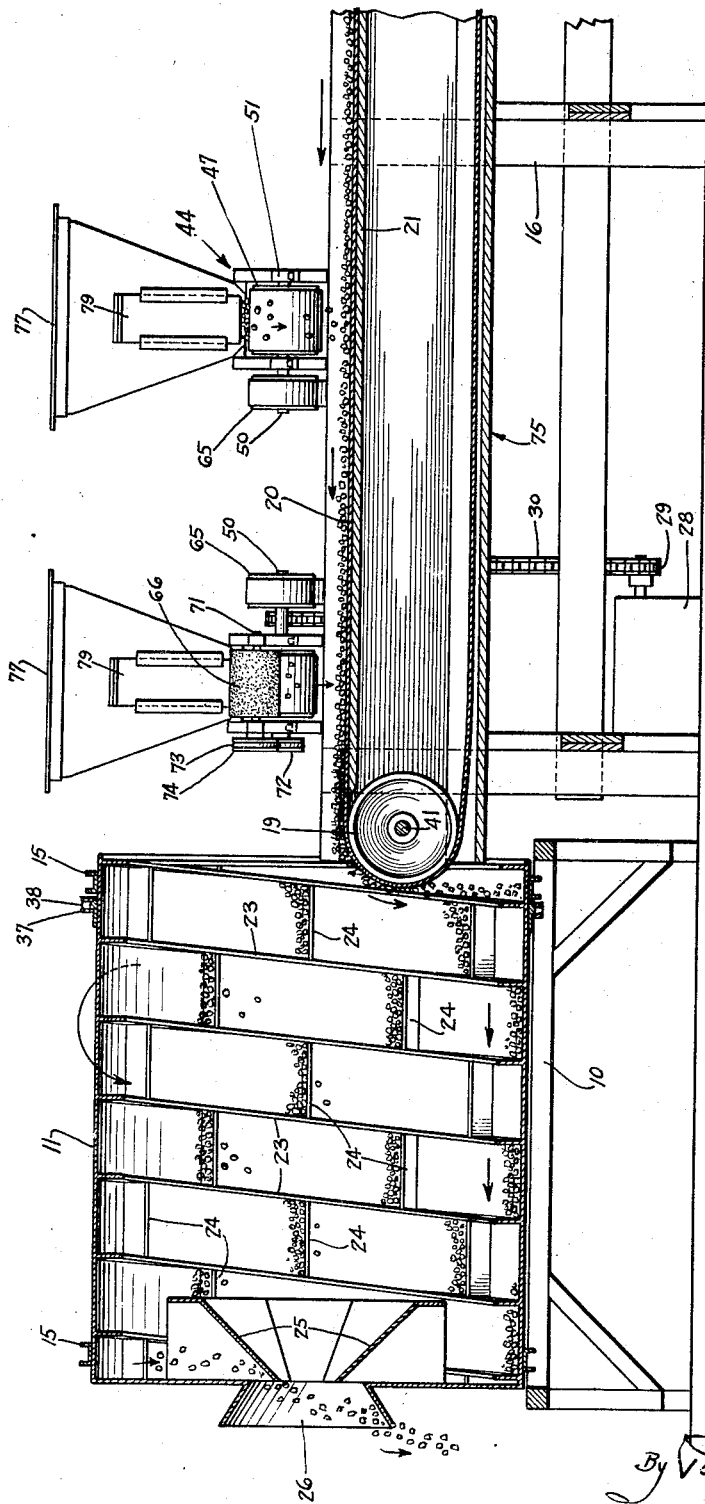

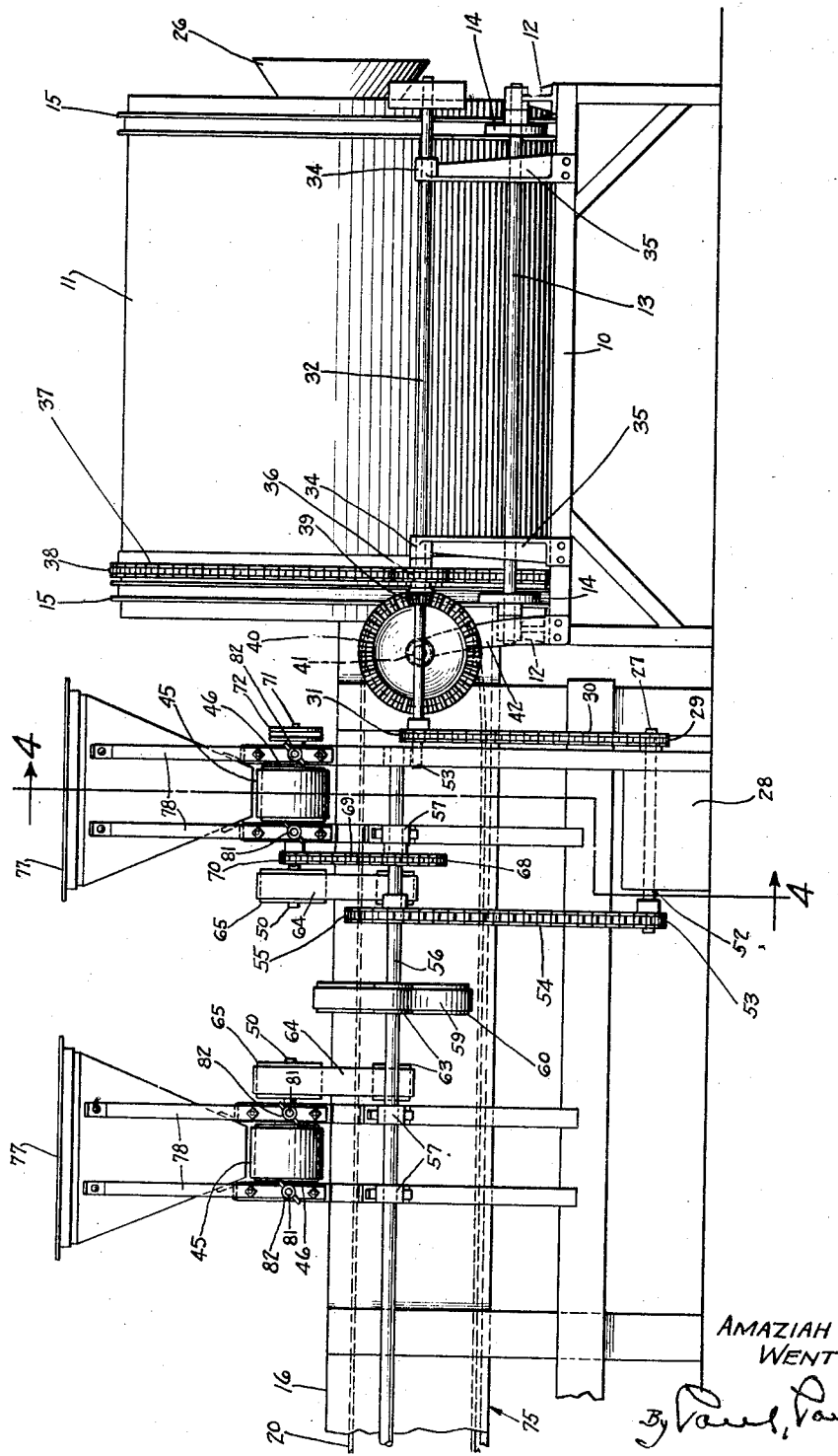

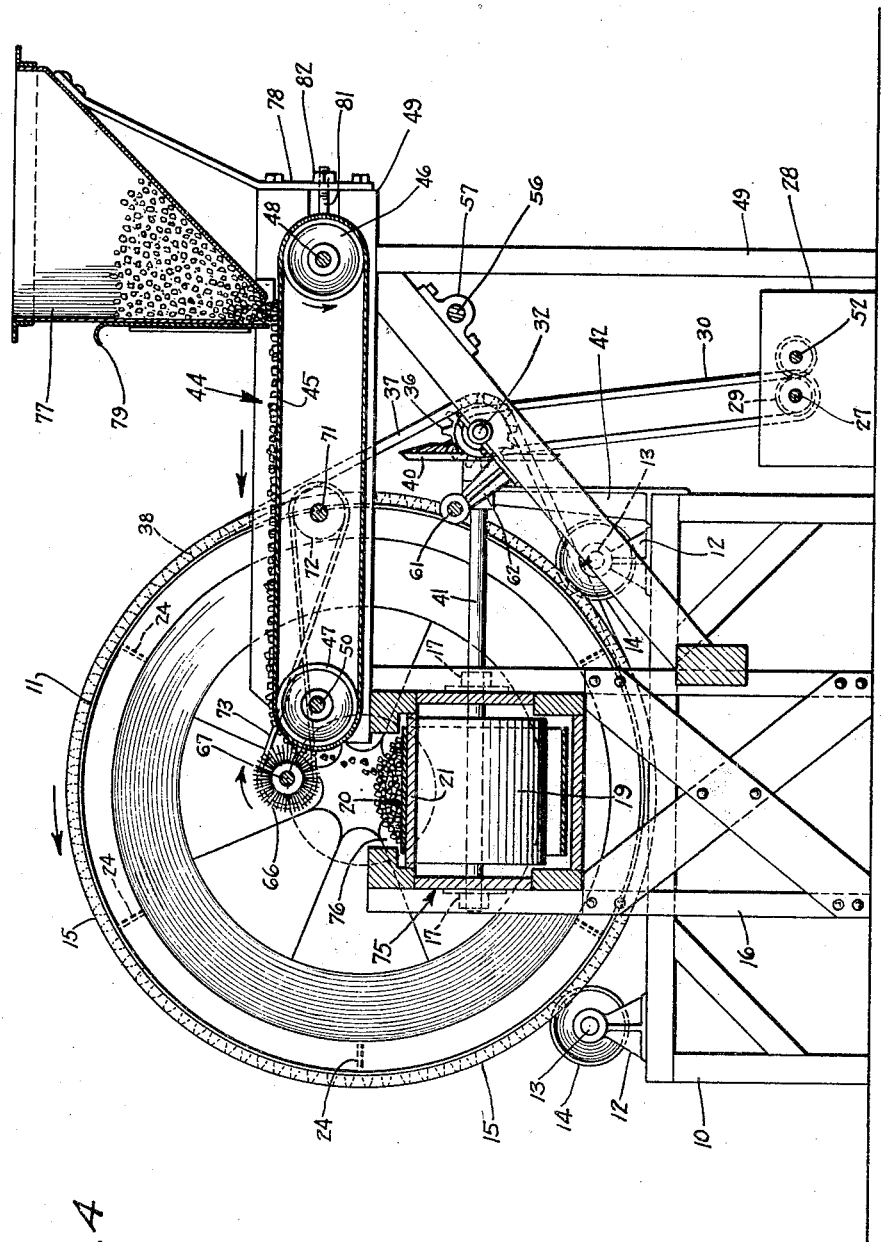

1,852,764

UNITED STATES PATENT OFFICE

AMAZIAH FILLMORE WENTWORTH, OF FAIRMONT, MINNESOTA, ASSIGNOR TO FAIRMONT CANNING COMPANY, OF FAIRMONT, MINNESOTA, A CORPORATION OF MINNESOTA

FOOD MIXING MACHINE

Application filed March 17, 1930. Serial No. 436,514.

This invention relates to a machine for mixing together different foods, such, for example, as different kinds of chopped vegetables or fruits to be used as vegetable or fruit salad.

The general object of the invention is to provide a machine which will be capable of feeding a plurality of different kinds of foods to a common mixed food supply, and whereby the amount of each different kind of food fed to the common food supply can be any preferred amount to constitute any desired proportion of the whole mixed food supply.

A more specific object is to provide a machine which will include a mixing drum adapted to deposit food into a common supply of mixed food, a main carrier member for transporting different kinds of foods to the mixing drum, and branch carrier members for transporting each different kind of food to the main carrier member.

A further specific object is to provide means in the machine for adjustably regulating the amount of food which can be fed by each branch carrier member to the main carrier member, whereby the amount of an individual food or foods fed to the mixture can constitute any desired proportion of the whole quantity of mixed food.

A further specific object is to provide means in the machine for positively removing from any or all of said branch carrier members food which might otherwise have tendency to stick thereto, and for depositing the food upon the main carrier member.

Other objects and advantages of the invention will become apparent from the full description thereof now to be made, it being understood that the disclosure herein is merely illustrative and intended in no way in a limiting sense, changes in details of construction and arrangement of parts being permissible so long as within the scope of the claims which follow.

In the accompanying drawings forming a part of this specification,

Fig. 1 is a plan view of a machine in which the features of the invention are incorporated, one of the hoppers being omitted to better disclose certain details of the construction;

Fig. 2 is an enlarged fragmentary vertical longitudinal sectional view taken on line 2—2 in Fig. 1;

Fig. 3 is an enlarged elevational view of a portion of the machine of Fig. 1;

Fig. 4 is an enlarged vertical transverse sectional view taken on line 4—4 in Fig. 3; and Fig. 5 is a view detailing features of one of the duplicate branch carrier members and a hopper for feeding food thereto.

With respect to the drawings and the numerals of reference thereon, 10 represents a frame adapted to be supported upon a floor and in turn rotatably supporting a horizontally disposed mixing drum 11. As shown, brackets 12 upon the frame 10 include bearings which carry shafts 13. Each shaft 13 carries spaced apart discs or rollers 14 adjacent the ends of the shaft. Oppositely disposed discs or rollers 14 are situated beneath the drum at opposite sides thereof, and ride in spaced apart circumferential channel members 15, one near each end of the mixing drum.

A second frame 16 includes suitable spaced apart bearings 17 supporting pulleys 18 and 19 upon which a main carrier member or belt 20 is arranged. As shown, the pulley 18 is an idler and the pulley 19 is a drive pulley.

The main carrier member or belt 20 is arranged adjacent an open end of the mixing drum 11, and is adapted to travel so that its upper length moves toward said mixing drum. A plate 21, suitably disposed beneath the upper length of the carrier member or belt 20 to support said upper length, is attached to the frame 16 in any convenient manner.

The carrier member or belt 20 is for the purpose of depositing food into the mixing drum, and said drum is adapted to transport the food conveyed to it into a hopper 22 leading from the drum to what may be termed a common mixed food supply. As shown more clearly in Figs. 2 and 4, the mixing drum 11 has a spiral 23 upon its interior face for conveying the food from the main carrier member or belt to the hopper 22, and also includes feed plates 24 between the walls of the spiral 23 and extending longitudinally of the mixing drum. Suitable scoop plates 25 are arranged adjacent the drum outlet 26 to insure positive feeding of the food from the mixing drum.

Means for driving the main carrier member or belt and for rotating the mixing drum includes a drive shaft 27 which protrudes from a transmission case 28. The shaft 27 can be driven from any suitable source of power, and the transmission case 28 includes mechanism (not shown) for adjusting the speed of the drive shaft 27 at any desired speed. A sprocket 29 upon the drive shaft 27 carries a chain 30 which passes over a sprocket 31 upon a shaft 32 having one of its ends mounted in a frame 49 as at 33, and its other end portion mounted as at 34 in brackets 35 carried by the frame 10. The shaft 32 carries a sprocket 36 upon which a chain 37 is arranged. The chain 37 passes about a sprocket 38 circumferentially disposed upon the outer face of the mixing drum 11 and secured thereto. A bevel gear 39 upon the shaft 32 meshes with an annular bevel gear 40 upon a shaft 41 which fixedly carries the drive pulley 19. The portion of the shaft 41 adjacent the annular bevel gear 40 is mounted in a bracket 42 carried by the frame 10. The opposite end portion of said shaft 41 is mounted in the bearings 17.

It will be evident that rotation of the drive shaft 27 will, through the instrumentality of the elements described, cause the mixing drum 11 to revolve upon the discs or rollers 14, and the main carrier member or belt 20 to feed ahead provided said shaft 27 is caused to rotate in the feeding ahead direction of said main carrier member or belt. The arrangement of the discs or rollers 14 in the channel members 15 precludes longitudinal movement of the mixing drum.

Each branch carrier member or belt, denoted 44, is situated at one side of the main carrier member or belt, desirably at right angles thereto, and the inner portion of each branch carrier member or belt is disposed directly above the upper length of the main carrier member or belt in position to deposit food thereupon. As disclosed, the branch carrier members or belts are all disposed in spaced relation to each other at the same side of the main carrier member or belt, although one or more of the branch carrier members or belts could be disposed at the other side of the main carrier member or belt.

Each branch carrier member 44 consists of a belt 45 ridable upon spaced apart pulleys 46 and 47, the outer pulley 46 being an idler pulley and the inner pulley 47 being a drive pulley. Each idler pulley 46 is carried by a shaft 48 suitably mounted upon the frame 49 which supports the branch carrier members or belts 44, while each drive pulley 47 is fixed to a shaft 50 suitably mounted in brackets 51 upon the frame 49.

Means for driving the branch carrier members or belts 44 includes a drive shaft 52 protruding from the transmission case 28, the said drive shaft 52 being adjustable as to speed in the same manner as the drive shaft 27. A sprocket 53 upon the drive shaft 52 carries a chain 54 which rides over a sprocket 55 upon a shaft 56 mounted upon the frame 49 as at 57. The shaft 56 also has a small pulley 58 carrying a belt 59 arranged over a larger pulley 60 fixed upon a short shaft 61 mounted in brackets 62 upon the frame 49. The short shaft 61 has small, spaced apart pulleys 63 each of which carries a belt 64, and each belt 64 rides upon a pulley 65 fixed upon a shaft 50. It will be evident by reference to Figs. 1 and 3 that rotation of the drive shaft 52 in proper direction will, through the instrumentality of the elements just described, cause the two carrier members or belts at the right to move the upper lengths of said branch carrier members or belts toward the main carrier member or belt. As shown more clearly in Fig. 1, the shaft 56 carries a small pulley 58' upon which a belt 59' is arranged, and the belt 59' rides over a pulley 60' secured directly upon the shaft 50 of the branch carrier member or belt at the left to thus drive this carrier member or belt. Any desired number of branch carrier members or belts, greater or less than three as shown, can be employed, and each branch carrier member or belt utilized can be driven in any convenient manner, as from the drive shaft 52.

One or more of the branch carrier members or belts 44 may be employed for the purpose of transporting food which has a tendency to stick and to not be easily removed from said branch carrier member or belt to fall to the main carrier member or belt by gravity. In such event, special means is employed to positively remove the food from the branch carrier member or belt. As shown more clearly in Figs. 1, 2 and 4, numeral 66 represents a rotary brush carried by a shaft 67 suitably mounted in extensions of brackets 51 which carry the shaft 50 of the branch carrier member or belt at the right in Fig. 1. A sprocket 68 upon the shaft 56 carries a chain 69 which rides over a sprocket 70 upon a shaft 71 mounted in the frame 49. The shaft 71 also carries a pulley 72. A belt 73 arranged upon the pulley 72 rides over a pulley 74 upon the shaft 67. Thus, by rotation of the drive shaft 52 to feed the branch carrier members or belts 44 ahead, the rotary brush 66 is driven in the direction of the arrow of Fig. 4 to wipe the food for the corresponding branch carrier member or belt and cause it to be deposited upon the main carrier member or belt. The arrangement is such that the rotary brush is caused to move at a more rapid rate of speed than the branch carrier belt to insure that the food will be positively wiped off.

As disclosed, the main carrier member or belt is disposed within an elongated housing, represented generally at 75, constructed to constitute a trough 76 above the upper length of the main carrier member or belt for insuring that the food will not be accidentally removed from the main carrier member or belt during its passage to the mixing drum. The housing 75 is serviceable to keep dirt away from the food which is carried by the main carrier member or belt.

A hopper 77 for each branch carrier member or belt is situated adjacent the outer end thereof to deposit food upon the belt as it moves ahead. As shown, each hopper 77 is conveniently supported upon the frame 49 as indicated at 78, and includes an adjustable gate 79 for regulating the amount of food allowed to pass to the corresponding branch carrier belt as it moves along. Obviously, elevating the gate 79 allows passage of an increased amount of food, and depressing said gate cuts down the amount of food which can pass to the belt.

The shafts 48 for the idler pulleys 46 are each mounted in blocks 80 slidably adjustable on the frame 49 by means of threaded rods 81 having nuts 82 which engage the hopper supports. By adjustment of the nuts upon the rods the idler pulleys 46 are moved inwardly or outwardly to adjust the tension of the branch carrier belts 44. See Figs. 4 and 5.

The machine as illustrated and described was designed more particularly for the purpose of mixing the ingredients of vegetable salad. It could, obviously, be employed for a variety of other purposes. In practice, the chopped-up vegetables are deposited in the hoppers 77, say, for example, a different chopped-up vegetable in each hopper. The gates 79 are independently adjusted to allow any desired amounts of the vegetables to progressively pass to the corresponding branch carrier belts as these advance. As the branch carrier belts move ahead, the food placed thereon from the hoppers is continuously spilled to the main carrier belt, and as the main carrier belt moves ahead and past the several branch carrier belts, the various ingredients of the salad to be made are spread along the main carrier belt in the general proportion in which the different foods are to occur in the salad. The food is carried to the mixing drum as the main carrier belt moves ahead, and is advanced by the spiral of the drum to the drum outlet. While in the drum the food becomes mixed, and upon leaving the drum and entering the hopper 22 and passing to the general mixed food supply, the ingredients of the food are in the proper proportion to be canned or otherwise disposed of. It being understood that desired quantities of the mixed food are removed from the general food supply to be canned or for other use.

It is assumed that such a food as pimiento might stick to a branch carrier member or belt, and the rotary brush 66 is for the purpose of insuring that a food which is liable to stick will be positively removed from a branch carrier member or belt and deposited upon the main carrier member or belt.

I claim as my invention:

1. A food mixing machine comprising a mixing drum for depositing food into a common supply of mixed food, a main carrier member for transporting different kinds of foods to said mixing drum, branch carrier members for transporting each different kind of food to constitute said common supply of mixed food to said main carrier member, and means for positively removing from a branch carrier member food which might otherwise have tendency to stick thereto, and for depositing said food upon said main carrier member.

2. A food mixing machine comprising a mixing drum for depositing food into a common supply of mixed food, a main carrier member for transporting different kinds of foods to said mixing drum, branch carrier members for transporting each different kind of food to constitute said common supply of mixed food to said main carrier member, means for independently regulating the amount of food fed by each branch carrier member to said main carrier member, and means for positively removing from a branch carrier member food which might otherwise have tendency to stick thereto, and for depositing said food upon said main carrier member.

3. A food mixing machine comprising a mixing drum for continuously depositing food into a common supply of mixed food, a main carrier member for continuously transporting different kinds of foods to said mixing drum, branch carrier members for continuously transporting each of the different kind of foods to constitute said common supply of mixed food to said main carrier member, and means for positively removing from a branch carrier member food which might otherwise have tendency to stick thereto, and for depositing said food upon said main carrier member.

4. A food mixing machine comprising a mixing drum for continuously depositing food into a common supply of mixed food, a main carrier member for continuously transporting different kinds of foods to said mixing drum, branch carrier members for continuously transporting each of the different kinds of foods to constitute said common supply of mixed food to said main carrier member, means for independently regulating the amount of food fed to said main carrier member by each branch carrier member, and means for positively removing from a branch carrier member food which might otherwise have tendency to stick thereto, and for depositing said food upon said main carrier member.

In witness whereof I have hereunto set my hand this 14th day of March, 1930.

AMAZIAH FILLMORE WENTWORTH.